United States Patent [19]

Fasolka et al.

[11] 4,448,939
[45] May 15, 1984

[54] POLYURETHANES PREPARED USING POLY (SILYLDIAMINES)

[75] Inventors: Michael J. Fasolka, Pennsburg; Barton Milligan, Coplay, both of Pa.

[73] Assignee: Air Products and Chemicals, Inc., Allentown, Pa.

[21] Appl. No.: 403,459

[22] Filed: Jul. 30, 1982

[51] Int. Cl.³ .................. C08L 75/04; C08L 83/16
[52] U.S. Cl. .................. 525/474; 525/453; 528/28
[58] Field of Search .................. 525/474; 528/28

[56] References Cited

U.S. PATENT DOCUMENTS

| | | | |
|---|---|---|---|
| 3,098,830 | 6/1963 | Rochow | 260/2 |
| 3,159,668 | 12/1964 | Rochow | 260/448.2 |
| 3,172,874 | 3/1965 | Klebe | 260/77.5 |
| 3,239,489 | 3/1966 | Fink | 260/77.5 |
| 3,243,475 | 3/1966 | Reischl | 260/824 |
| 3,337,510 | 8/1967 | Klebe | 260/77.5 |
| 3,354,098 | 11/1967 | Byrd | 260/2 |
| 4,133,943 | 1/1979 | Blahak et al. | 521/163 |

FOREIGN PATENT DOCUMENTS 2458858  6/1975  Fed. Rep. of Germany ........ 528/28

OTHER PUBLICATIONS

K. A. Adrianov et al., Zhurnal Obshchei Khimi, vol. 33, 1294–1299 (1963).

C. E. Carraher, Jr., Journal of Polymer Science: Part A-1, vol. 8, 3051–3059 (1970).

J. F. Klebe et al., Journal of Amer. Chem. Society, vol. 86, 4400 (1964).

*Primary Examiner*—Wilbert J. Briggs, Sr.
*Attorney, Agent, or Firm*—Michael Leach; E. Eugene Innis; James C. Simmons

[57] ABSTRACT

A composition for preparing polyurethanes comprising an organic polyisocyanate; a poly(silyldiamine) of the unit formula

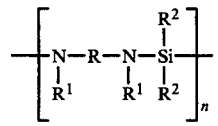

wherein the grouping

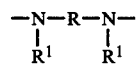

is a divalent organic radical terminated by two nitrogen atoms with R being a divalent organic moiety, or a divalent alicyclic radical in which R and $R^1$ with the two nitrogens form a cyclic diamine structure, $R^1$ is hydrogen or a monovalent hydrocarbon, $R^2$ is a monovalent hydrocarbon, and n is an integer greater than 1; and a polyol. When poly(silyldiamines) of the above formula are reacted with a polyisocyanate prepolymer and a polymeric polyol, elastomeric polyurethanes having good elastomeric properties are obtained.

23 Claims, No Drawings

1

POLYURETHANES PREPATED USING POLY(SILYLDIAMINES)

TECHNICAL FIELD

The invention relates to polyurethane formulations containing diamine chain extenders.

BACKGROUND OF THE INVENTION

Polyurethane elastomers, which are formed from polyisocyanate prepolymers and polyether or polyester polyols, are polymers of moderate molecular weight having, according to present theory, flexible "soft segments" and polar, rigid "hard segments." The thermal and hydrolytic stability of the elastomers is improved if the hard segments comprise urea type linkages rather than urethane linkages. However, simple diamines cannot be used as "chain extenders" in place of diols to form urea linkages because the high reactivity of the diamines toward the isocyanates results in insufficient "pot life" for fabrication in available equipment.

Three modes of reducing the reactivity of the diamines toward the isocyanates in order to obtain useable pot lives have been developed. These modes are steric hindrance, electronic deactivation and blocking groups. An example of steric hindrance is the placement of alkyl groups in the positions ortho to the amine functions in aromatic diamines. The diethyl derivative of toluenediamine (TDA), which is made from ethylene and TDA, is a specific example. Less desirable properties in the elastomer and a relatively limited degree of deactivation are the disadvantages of this approach.

An example of electronic deactivation is the use of a chlorine substituted aromatic diamine such as methylenedi-o-chloroaniline (MOCA). While it provides long pot life and good elastomeric properties, MOCA has undesirable toxological properties and its use is no longer allowed in the United States.

Blocking groups are chemicals which react with reactive groups, such as isocyanate, and are later removed under the influence of processing conditions to regenerate the original reactive group. To be acceptable in an elastomer, a blocking group upon liberation must be so compatible with the polymeric structure formed that it never migrates to the surface or must be incorporated into the polymeric structure.

U.S. Pat. Nos. 3,098,830; 3,159,668 and 3,354,098 teach the reaction of a diamine with a diorganodihalogenosilane to yield diorganosilylamine polymers.

U.S. Pat. No. 3,172,874 discloses the reaction of a diisocyanate and a triorganosilylamine to yield polysilylureas which are readily hydrolyzed to polyureas.

U.S. Pat. No. 3,239,489 discloses poly-urea-silazanes prepared from the reaction of polyisocyanates and polyfunctional silazanes.

U.S. Pat. No. 3,243,475 discloses reacting a polyester, a polyisocyanate and certain reactive organosilicon compounds to yield elastomeric polyurethanes having improved hydrophilic characteristics and useful in making automobile tires.

U.S. Pat. No. 3,337,510 teaches the reaction of diisocyanates with bis(organosilyl)amines to yield polysilylbiurets which upon hydrolysis yield polybiurets.

SUMMARY OF THE INVENTION

The invention relates to a polyurethane formulation having means for reducing the reactivity of a diamine towards an isocyanate functionality permitting longer pot life in the formation of polyurethanes. The invention utilizes a blocking entity for the diamine in such a way that the blocking entity, upon removal, becomes incorporated into the ultimate polymer structure. Silyl groups are used to block the amine functionalities. A diamine is converted to a poly(silyldiamine) by reaction with a bifunctional silicon derivative to produce the silyldiamine polymer.

A polyurethane formulation embodying the invention comprises an organic polyisocyanate; a poly(silyldiamine) of the unit formula

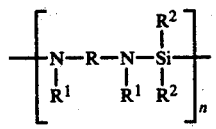

wherein the grouping

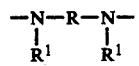

is a divalent organic radical terminated by two nitrogen atoms with R being a divalent organic moiety, or a divalent alicyclic radical in which R and $R^1$ with the two nitrogen atoms form a cyclic diamine structure, $R^1$ is hydrogen or a monovalent hydrocarbon, $R^2$ is a monovalent hydrocarbon, and n is an integer greater than 1; and a polyol.

In a preferred embodiment for preparing an elastomeric polyurethane composition the invention comprises (a) a polyisocyanate prepolymer of the formula

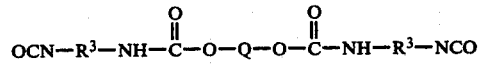

wherein $R^3$ is a divalent organic radical and Q is a divalent polymeric chain, (b) a polysilyldiamine of the unit formula

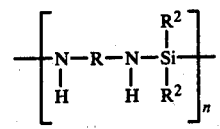

wherein R is a divalent organic radical, $R^2$ is a monovalent hydrocarbon and n is an integer greater than 1, and (c) a polyol of the formula HO—$Q^1$—OH wherein $Q^1$ is a divalent polymeric chain.

Further embodiments of the invention include the polyurethanes prepared by reacting polyurethane formulations comprising the above designated polyisocyanates, polysilyldiamines and polyols.

As an advantage of using the silyl group as a blocking group for a diamine in the form of diorganosilyldiamine polymers, the reactivity of the diamine is slowed down to a degree where the formulations can be readily handled in commercial processing equipment without prematurely curing.

As a further advantage the silyl blocking group, which is liberated upon the reaction of the diamine, is incorporated into the polymeric structure of the composition and does not migrate to the surface of the cured product leaving a deleterious coating.

As another advantage the polyurethane reaction products possess a degree of resistance to hydrolysis, or hydrolytic stability, by the generation of carbodiimide functionalities during the curing process. Carbodiimides are known to scavenge water.

DETAILED DESCRIPTION OF THE INVENTION

The invention provides polyurethane formulations containing less reactive diamine chain extenders. Adding a polysilyldiamine to a mixture comprising a polyisocyanate and a polyol affords polyurethane formulations which, upon curing, yield polyurethanes incorporating the silyl blocking group as a dioxysilane moiety.

The organic polyisocyanates used in the compositions of this invention correspond to the general formula $$R^4(NCO)_x$$

wherein x is an integer of at least 2 and $R^4$ is an organic radical having x isocyanate groups. The organic radical can be aliphatic, cycloaliphatic, aromatic, heterocyclic or polymeric comprising a polyether or polyester structure. The preferred polyisocyanate reactants for use in the invention are diisocyanates wherein the divalent organic radical is aromatic or polymeric having aromatic end groups containing the isocyanate radicals.

Examples of suitable polyisocyanates are ethylene diisocyanate, 1,2-diisocyanatopropane, butylenediisocyanate, hexamethylene diisocyanate, phenylene diisocyanate, toluene diisocyanate, naphthalene diisocyanate, isophorone diisocyanate, xylene diisocyanate, 4,4'-diisocyanatodiphenyloxide, 4,4'-diphenylmethane diisocyanate, 4,4',4"triphenylmethane triisocyanate and the reaction products of polyhydric alcohols with an excess of diisocyanate such as, for example, the reaction product of trimethylolpropane with an excess of toluene diisocyanate. The presence of inert substituents on the aromatic nucleus of aromatic diisocyanates, for example, halogens such as chlorine or bromine, nitro groups, cyano groups, ether groups as well as other hydrocarbon radicals such as alkyl, aryl, aralkyl and alkaryl radicals is also contemplated. It is essential that there be no substitution of reactive groups, such as an amine, a hydroxy, a carboxy, or similar reactive atoms or groups. Especially suitable are the 2,4- and 2,6-toluene diisocyanates individually or together as their commercially available mixtures. Other suitable mixtures of diisocyanates are those known commercially as "crude MDI", also known as PAPI, which contain about 60% of 4,4'-diphenylmethane diisocyanate along with other isomeric and analogous higher polyisocyanates.

Other suitable polyisocyanates for use in this invention are those listed in U.S. Pat. No. 4,065,410, which is incorporated by reference.

With respect to the preparation of elastomeric polyurethane materials the polyisocyanate advantageously comprises a polyisocyanate prepolymer formed by reacting an excess of an aromatic polyisocyanate with a polyol. The polyol used in forming the prepolymer is typically a conventional polyalkylene ether or polyester with terminal hydroxyl groups and a molecular weight from about 500 to 5,000. These polyols may have short chain alkyl group substitution, for example, two to three carbon atoms in the alkyl structure.

Polyalkylene ether polyols are generally formed by condensing an alkylene oxide, such as ethylene oxide, propylene oxide and the like, with a diol or triol such as ethylene glycol, propylene glycol, 1,4-butanediol, 1,6-hexanediol, glycerol and the like.

Polyester polyols are generally formed by condensing a dicarboxylic acid, such as adipic acid, azelaic acid, phthalic anhydride and the like, or a lactone such as caprolactone with excess diol or triol such as ethylene glycol, propylene glycol, 1,4-butanediol, glycerol and the like.

Preferred polyols include poly(tetramethylene glycol), and polycaprolactone.

Linear polyester polyols from the reaction of a dicarboxylic acid and a diol and linear polyalkylene ether polyols from the reaction of an alkylene oxide and a diol lead to elastomeric polyurethanes while the use of a triol leads to a more rigid polyurethane. Essentially any degree of flexibility or rigidity can be obtained by proper choice of reactants.

Examples of polyisocyanate prepolymers include the reaction product of an excess of 2,4- and/or 2,6-toluene diisocyanate and polycaprolactone and the reaction product of an excess of 2,4-toluene diisocyanate and poly(tetramethylene glycol).

Contemplated as the functional, or operative, equivalent of the polyisocyanates used in the formulation of this invention are those compounds having stabilized or blocked isocyanate groups, for example those in which the isocyanate groups have been reacted with phenol, which upon heating regenerate the isocyanate functionality and a monomeric blocking moiety.

Illustrative of suitable polyols as a component of the polyurethane formulation of this invention are the polyhydric compounds including especially diols and triols. Specific compounds include, among others, ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, polyvinyl alcohol, trimethylol propane, cyclohexanediol, cyclohexanedimethanol, hydrogenated bisphenol, hydrogenated bisphenol-alkylene oxide addition products, or bisphenol-alkylene oxide addition products and the like.

Other suitable polyols, especially for the elastomeric polyurethane formulations, are the polyalkylene ether and polyester polyols which have been described above for the preparation of the polyisocyanate prepolymers. Again, these include the poly(alkylene oxide) polymers such as poly(ethylene oxide) and poly(propylene oxide) polymers and copolymers with terminal hydroxyl groups and polyester polyols such as those produced by reacting a dicarboxylic acid with an excess of a diol, for example, adipic acid with ethylene glycol, or reacting a lactone with a diol such as caprolactone and propylene glycol.

Other suitable polyols for use in the compositions of this invention are those listed in U.S. Pat. No. 4,133,943, which is incorporated by reference.

The key ingredient in the polyurethane formulations of the invention is the poly(silyldiamine) of the unit formula

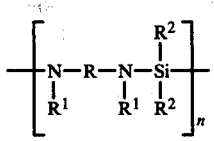

wherein the grouping

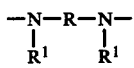

is a divalent organic radical terminated by two nitrogen atoms with R being a divalent organic moiety, or a divalent alicyclic radical in which R and $R^1$ with the two nitrogen atoms form a cyclic diamine structure, $R^1$ is hydrogen or a monovalent hydrocarbon, $R^2$ is a monovalent hydrocarbon radical, and n is an integer greater than 1, preferably about 15 to 25.

Diorganosilyldiamine polymers of the above formula can be prepared by reacting a diamine with a bifunctional derivative of silicon according to the following reaction formula

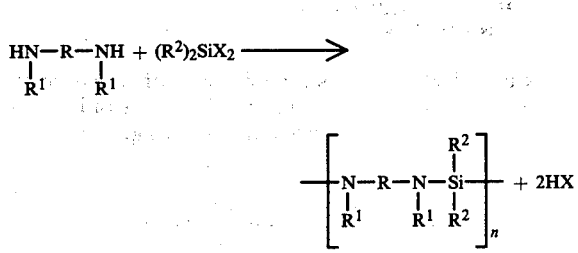

wherein R, $R^1$ and $R^2$ have the above meanings and X represents a halogen, dialkylamine, alkylsulfate or any other organic radical which is a known reactive or leaving group when attached to a silicon atom in the preparation of silicon polymers.

The reaction is carried out in such a way that the moiety HX is removed from the sphere of the reaction. Thus, if X is chlorine, the reaction is carried out in a nonpolar solvent such as benzene, toluene or ether in the presence of a tertiary amine such as triethylamine or excess diamine so that hydrogen chloride is precipitated as the hydrochloride salt of the tertiary amine or diamine. The reaction is conveniently carried out at the reflux temperature of the solvent at atmospheric pressure, but higher or lower temperatures could be used since reflux is not required to effect the reaction. The choice of solvent is dictated by the solubility of the product polymer. Benzene and toluene are preferred if the diamine is aromatic, for example toluene diamine, because the product is then readily soluble.

If X is a dialkylamino group, the reaction can be carried out in the absence of a solvent in a distilling apparatus which permits the dialkylamine to be removed as it is formed. Higher temperature usually over 100° C. are required to effect the reaction. The upper limit of temperature would be the temperature at which one of the reactants would begin to distill with the dialkylamine by-product. Thus the temperature can be raised as the reaction proceeds and the concentration of low molecular weight reactants becomes lower. Vacuum can be applied at the end of the reaction to remove the last traces of dialkylamine.

For more information regarding the preparation of the poly(silyldiamines) reference is made to U.S. Pat. Nos. 3,098,830, 3,159,668 and 3,354,098; K. A. Adrianov, et al., Zhurnal Obschei Khimii, 33, 1294–1299 (1963); and C. E. Carraher, Jr., J. Polymer Sci., Part A-1, 8, 3051 (1970) which are incorporated by reference.

Illustrative of the divalent organic radical represented by R in the above formulas are $C_2$–$C_{10}$ alkylene radicals, such as ethylene, trimethylene, isobutylene, hexamethylene, and the like; cycloalkylene radicals, such as cyclohexylene, cycloheptylene; arylene radicals, such as m-phenylene, p-phenylene, tolylene and the like. Illustrative of the monovalent hydrocarbon radicals represented by $R^1$ are $C_1$–$C_4$ alkyl radicals such as methyl, ethyl, propyl and butyl. When R and $R^1$ with the two nitrogen atoms form a cyclic diamine structure, such groupings can be, for example, the piperazyl radical and substituted piperazyl radicals.

Representative of the diamines useful in preparing the poly(silyldiamines) are ethylenediamine, propylenediamine, hexamethylenediamine, m-phenylenediamine, p-phenylenediamine, 1,4-diaminocyclohexane, 2,4-toluenediamine, 2,6-toluenediamine, $N,N^1$-dimethyl-2,4-toluenediamine, piperazine and the like. Other suitable diamines are disclosed in U.S. Pat. No. 3,172,874 which is incorporated by reference.

Illustrative of the monovalent hydrocarbon radicals represented by $R^2$ in the above formulas are $C_1$–$C_8$ alkyl radicals such as methyl, ethyl, propyl, butyl, octyl; aryl radicals, such as phenyl, naphthyl, xylyl, tolyl and the like; aralkyl radicals, such as benzyl, phenylethyl, and the like; alkenyl radicals, such as vinyl, and allyl; cycloalkyl radicals, such as cyclohexyl and cycloheptyl; cycloalkenyl radicals, such as cyclohexenyl.

The presence of inert substituents (i.e., inert to the reactants including the polyisocyanate and the reaction products) on the organic radicals R, $R^1$ and $R^2$ as, for instance, ethers, esters and the like, is not precluded.

Representative of specific difunctional diorganosilanes are dimethyldichlorosilane, diphenyldichlorosilane, dicyclohexyldichlorosilane, bis(diethylamino)diethylsilane, bis(diethylamino)methylphenylsilane, bis(diethylamino)ethylphenylsilane, bis(dimethylamino)methylallylsilane, bis(dimethylamino)dimethylsilane, bis(dimethylamino)propylmethylsilane, bis(dimethylamino)diphenylsilane and the like.

Exemplary of the diorganosilyldiamine polymers useful in the invention are poly(dimethylsilylethylenediamine), poly(dimethylsilyltoluenediamine), poly(diethylsilylethylenediamine), poly(methylethylsilyltoluenediamine), poly(methylphenylsilyl-1,4-butylenediamine), poly(dimethylsilylpiperazine), poly(diphenylsilyltoluenediamine), poly(propylmethylsilylphenylenediamine) and the like.

Polyurethane formulations using chain extenders known in the art in combination with polyols must be employed in quite precise stoichiometry in relation to the isocyanate prepolymer. If A = equivalents of chain extender P = equivalents of polyol and I = equivalents of free isocyanate in the prepolymer, then for exact stoichiometry $A = (I-P)$.

As a practical matter better products are obtained if an "isocyanate index" greater than 1 and up to about 1.05 is used, that is A should fall between $(I-P)$ and about $0.9 (I-P)$, but in special cases values of A up to about $1.1 (I-P)$ might be useful. The ratio of A to P is an independent variable whose value is determined by the properties desired in the product and by practical considerations such as solubility and the fact that, in applications where the components are mixed by machine, the volumes of the components mixed together need to fall roughly in the range of 1/2 to 2/1.

Because of special properties of poly(silyldiamines) to be described below, the polyurethanes of this invention can utilize a much broader range of compositions. As will be seen, materials in the range of molecular weights that are ordinarily useful can be obtained if the number of equivalents of poly(silyldiamine) chain extender, A, falls within the range of about 0.9 (I−P) to (I+P). For the purposes of this calculation the equivalent weight of the poly(silyldiamine) is equal to one half the formula weight of $-[N(R^1)-R-N(R^1)-Si(R^2)_2]-$ where R, $R^1$ and $R^2$ are as defined previously. The preferable range of A is from (I−P) up to about (I+P)/2. The special case in which I=P is also operative, but in this event obviously A must be greater than (I−P).

Formulations comprising the polyisocyanate, poly(silyldiamine) and polyol outside the preferred ratios tend to yield polyurethane reaction products having inferior properties in that they lack strength and tear resistance.

The three ingredients may be simply mixed together if one of them is a liquid, otherwise it is preferred to use a solvent to facilitate their mixing and the reaction. Ideally, the poly(silyldiamine) is dissolved in the polyol with heating if necessary and then the mixture is combined with the polyisocyanate. Suitable solvents are those organic solvents which are inert with respect to the isocyanate functionality, such as aliphatic and aromatic hydrocarbons, ethers, halogenated hydrocarbons and the like.

Any temperature may be used for effecting the reaction among the three components. However, since the reaction rate at the lower temperatures is very slow, it is preferred to heat the reaction mixture preferably to temperatures above about 40° C., especially in the range of 50° to 70° C. Since pressure is not a critical parameter, the reactions are suitably conducted at atmospheric pressure although higher or lower pressures could be used.

The polyurethane formulations may also contain one or more of the known types of conventional additives, which are employed for their known purposes in the usual amounts. Catalysts, emulsifiers to promote mixing, flow agents, plasticizers, pigments and fillers, reinforcing fillers and mold release agents or lubricants are illustrative of such additives.

Catalysts such as tin compounds, mercury compounds, tertiary amines and others known in the art are employed in a catalytically effective amount, such as, for example, from about 0.01 to 2 wt %.

Pigments and fillers, such as clay, hydrated alumina, silica, calcium carbonate, various pigments such as iron oxide, titanium oxide and carbon black may be included in the polyurethane mix.

Reinforcing fillers such as glass fibers or fabrics, asbestos fibers or fabrics, various organic fibers or fabrics such as those made of polypropylene, acrylonitrile/vinyl chloride copolymer and the like may be added.

Mold release agents or lubricants include zinc stearate, calcium stearate and others known in the art.

Although not intending to be bound by any particular theory, it is believed that the polyurethanes, which are formed by reacting the polyisocyanate, poly(silyldiamine) and polyol, are produced according to the following postulated mechanism. The preparation of an elastomeric polyurethane will serve to explain the proposed mechanism. To simplify the presentation of the mechanism the following notation has been adopted:

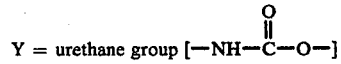

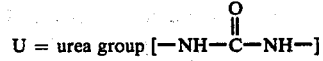

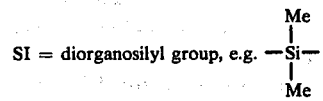

Thus an isocyanate terminated prepolymer is prepared from a high molecular weight diol plus an aromatic diisocyanate according to the following reaction:

HO ~ OH + 2OCN—Ar—NCO → OC-
N—Ar—Y ~ Y—Ar—NCO

A combination of this prepolymer with an aromatic diamine and a diol chain extender in a 2:1:1 ratio, as is customarily practiced, yields the following:

2OCN—Ar—Y ~ Y—Ar—NCO + -
HO ~ OH + H₂N—Ar—NH₂ → OC-
N—Ar—Y ~ Y—Ar—U—Ar—U—Ar—Y-
Y—Ar—Y ~ OH

The segments of the polymer chains containing the urea groups are known as "hard segments". It is believed that hydrogen bonding between the hard segments in adjacent chains results in microcrystal line regions that give rise to the elastomeric property.

A similar result is obtained if prepolymer, polysilylamine and diol are combined in the ratio 2:1:2 in the following manner:

2OCN—Ar—Y ~ Y—Ar—NCO + 2H ~ OH ⟶

OCN—Ar—Y ~ Y—Ar—Y ~ OH

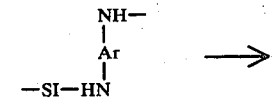

OCN—Ar—Y ~ Y—Ar—Y ~ OH

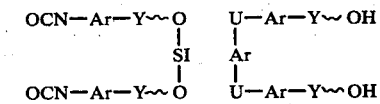

Since the diamine contains a diorganosilyl blocking group, it is now less reactive permitting the isocyanate prepolymer and the diol to react initially to yield a polymer chain containing urethane groups. The deactivated amino groups of the diamine each then react with a urethane group to yield a urea group while liberating moieties containing terminal oxy functionality which in turn react with the liberated diorganosilyl functionality to impart dioxysilane groups to the polyurethane structure. In the presence of excess poly(silyldiamine) further urea groups can be generated in the polymer chain. The result is hard segments containing urea groups and segments containing dioxysilane groups, thus imparting different elastomeric properties to the cured polyurethane products.

Another reaction by which poly(silyldiamines) can participate in the polymerization process is to combine with the isocyanate. In U.S. Pat. Nos. 3,172,874 and 3,337,510 Klebe describes the reactions of silylamines having monofunctional silyl moieties with isocyanate to form silylated ureas. In J. Am. Chem. Soc. 86, 4400 (1964) Klebe, Bush and Lyons describe in greater detail the properties of various silylated ureas bearing monofunctional groups. Klebe, et al. describe two processes which are important in our invention. First, silyl groups can move with ease from one urea nitrogen atom to another. Thus the equilibrium below is readily attained.

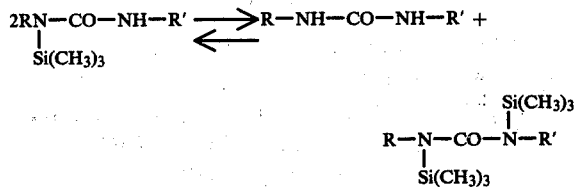

Second, at about 150° C. N,N'-diphenyl-N,N'-bis(trimethylsilyl)urea decomposes into hexamethyldisiloxane and diphenyl carbodiimide.

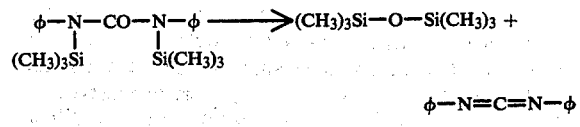

We postulate that these reactions are an important part of the process whereby polyurethane systems are cured with poly(silyldiamines). Using the symbolism defined above the main possibilities are illustrated by the following equations:

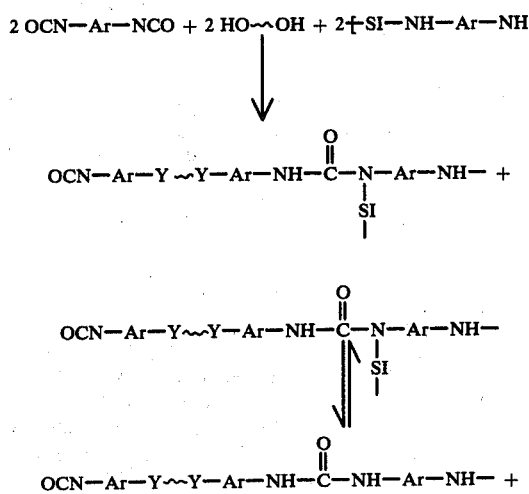

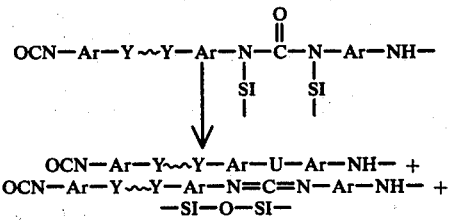

Thus carbodiimide groups are introduced into the polymer structure.

The use of polyisocyanates containing limited amounts of carbodiimide to alter their melting points is known in the art. The polyurethanes made from such polyisocyanates are thought to have an added advantage of resistance to hydrolysis through the known property of carbodiimides to scavenge water by forming ureas. This same advantage of resistance to hydrolysis, or hydrolytic stability, will apply to the products of this invention.

A third interaction between the components of our invention is possible. That interaction, which has a slow rate, is the reaction of polyol with poly(silyldiamine) as shown below:

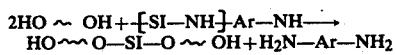

To the extent that this reaction occurs it is also beneficial because the products, a diamine and a new diol of approximately doubled molecular weight, can function as normal constituents of the polyurethane composition.

Accordingly, a wide range of formulations should give useable elastomers with a continuously variable range of properties. The lesser reactive poly(silyldiamines) afford a longer, more commercially acceptable pot life for the formulations and the diorganosilyl blocking group becomes part of the polymeric structure where it will remain in contrast to prior art blocking groups of the polyisocyanate or diamine which were free to migrate out of the cured composition onto the surface.

The following examples are intended to illustrate the nature of the invention without limiting its scope.

EXAMPLE 1

This example shows the preparation of poly(dimethylsilylethylenediamine) using dimethyldichlorosilane and ethylenediamine. Dimethyldichlorosilane is commercially available from a number of suppliers.

Under a nitrogen blanket, 90.15 g (1.5 moles) ethylenediamine and 100 ml toluene were added to a flask and stirred followed by the dropwise addition of 64.68 g (0.5 moles) dimethyldichlorosilane in 50 ml toluene. The reaction was stirred at room temperature for 2 hours at which time the reaction liquid had formed 2 layers comprising a clear transparent top layer and a yellow viscous translucent bottom layer. The reaction mixture was heated to reflux for about 1.5 hours. Upon cooling the reaction liquid showed 2 layers which were filtered under a nitrogen atmosphere leaving 1.15 g of a precipitate. The majority of the toluene was removed from the filtrate by distillation. Heating to 65° C. under vacuum was used to take off the remainder of the toluene leaving a light yellow wax-like residue. The residue comprised a light yellow, wax-like top layer and a dark yellow, crystalline-like bottom layer. A soxhlet extraction using benzene was performed on 51.1 g of material from the top layer. The benzene was removed by distillation from the extract yielding 23.8 g of a cloudy semitransparent yellow residue. Carbon and proton NMR analysis showed the ethylenediamine and silicon in a 1:1 ratio.

EXAMPLE 2

In this example poly(dimethylsilylethylenediamine) was prepared by a transamination reaction.

Under anhydrous conditions, 30.4 g (0.5 moles) ethylenediamine and 73.2 g (0.5 moles) bis(dimethylamino)-dimethylsilane were added to a reaction vessel and heated to about 100° to 105° C. for 3.5 hours. During this time 41.8 g dimethylamine distilled leaving a transparent, slightly viscous, light yellow residue weighing 56.8 g. The viscous liquid was further distilled in a kugelrohr apparatus at about 100° C. using vacuum of about 30 microns Hg yielding 43 g of a transparent, slightly viscous, light yellow residue whose elemental analysis showed 40.51% carbon, 9.86% hydrogen and 18.26% nitrogen.

Bis(dimethylamino)dimethylsilane is available from Petrarch Systems, Inc., Bristol, PA and Silar Lab, Scotia, NY.

EXAMPLE 3

This example shows the preparation of poly(dimethylsilyltoluenediamine) using a dimethyldichlorosilane and toluenediamine.

Under anhydrous conditions and a nitrogen atmosphere 60.2 g (0.493 moles) of freshly distilled toluenediamines (meta TDA) and 101 g (1.0 moles) triethylamine were dissolved in 500 ml toluene at reflux. With the slight flow of nitrogen passing through the agitated mixture, 62.3 g (0.483 moles) dimethyldichlorosilane was added dropwise over a 35 minute period followed by heating at reflux for 3 hours. Upon cooling the toluene solubles were filtered leaving 132.81 g triethylamine hydrochloride after washing the precipitate twice with 200 ml dry toluene and removal of residual solvent. The toluene was removed from the filtrate yielding 86.82 g of poly(dimethylsilyltoluenediamine). Elemental analysis showed 60.11% carbon, 8.49% hydrogen, 15.91% nitrogen, 15.85% silicon and 0.11% chlorine.

EXAMPLE 4

This example shows the preparation of poly(dimethylsilyltoluenediamine) via a transamination reaction.

Under anhydrous conditions and a nitrogen atmosphere 724.5 g (5.93 moles) distilled meta-toluenediamine was charged to a reaction vessel at about 70° C. followed by 866.8 g (5.92 moles) bis(dimethylamino)-dimethylsilane yielding a two phase mixture at about 50° C. and liquid condensing into a dry ice-acetone trap. The temperature was kept at about 50° C. for about 1 hour yielding approximately 20 g of dimethylamine. The temperature was then raised to 77° C. for 3 hours and then to 136° C. for 2 hours. The total dimethylamine distillate was 481.5 g. The reaction vessel was cooled to about 90° C. with a water bath and permitted to attain room temperature over night. The reaction mixture was then heated to 120° C. under a slight vacuum (100 mm Hg) for 2 hours, followed by heating to 140° C. at 20 mm Hg yielding an additional 41.9 g of dimethylamine. Further heating for 2 hours at 135°–140° C. and increasing vacuum from 10 to 3 mm Hg yielded in additional 2.8 g of dimethylamine for a total dimethylamine recovery of 526.2 g or 98.8% theoretical yield. Elemental analysis of the residue showed 60.70% carbon, 8.24% hydrogen, 15.715% nitrogen and 15.36% silicon.

EXAMPLE 5

In this example elastomeric polyurethane compositions were prepared from mixtures of poly(dimethylsilyltoluenediamine) [poly(silyl-TDA)] with Adiprene L-167 isocyanate prepolymer and CAPA 220 diol. Adiprene L-167, which is a commercial isocyanate prepolymer marketed by DuPont and Company, is prepared by the reaction of polytetramethylene oxide in the presence of excess 2,4-toluenediisocyanate. The prepolymer had a free isocyanate value of 6.52%. CAPA 220 is a commercial polymeric diol manufactured from caprolactone and marketed by Interox, Ltd. of Luton, England. The diol has a hydroxyl number (—OH #) of 54.0. The prepolymer, polysilyldiamine, and diol had equivalent weight values of 644, 89 and 1,039 respectively.

To prepare an elastomeric polyurethane composition, the poly(silyl-TDA) was dissolved in the diol with heating. This mixture was heated to approximately 40° C. for about 30 minutes and then mixed with the prepolymer which had also been heated to 40° C. for about 30 minutes. The resulting mixture was then poured into a preheated (100° C.) mold (4×8×0.25″) and maintained at 100° C. for 16 hours. The relative amounts of the three components in Runs 1 to 9 and the properties of the elastomeric polyurethane products are given in Table 1.

TABLE 1

| RUN | 1 | 2 | 3 | 4 | 5 | 6 | 7 | 8 | 9 |
|---|---|---|---|---|---|---|---|---|---|
| Prepolymer (Adiprene L-167) gm | 69.3 | 55.93 | 69.2 | 55.9 | 54.5 | 62.48 | 63.21 | 55.22 | 53.19 |
| Poly(silyl-TDA) gm | 6.3 | 3.86 | 6.4 | 3.9 | 7.5 | 6.91 | 5.24 | 5.72 | 11.02 |
| Diol (CAPA 220) gm | 74.4 | 90.2 | 74.4 | 90.2 | 87.9 | 80.61 | 81.55 | 89.06 | 85.79 |
| Equivalents Ratio Prepolymer:Poly(silyl-TDA):Diol | 3:2:2 | 2:1:2 | 3:2:2 | 2:1:2 | 1:1:1 | 5:4:4 | 5:3:4 | 4:3:4 | 2:3:2 |
| Shore "A" Hardness$^a$ | 77 | 90 | 82 | 90 | | 80/90 | 82 | 93 | |
| Shore "A" Hardness$^b$ Top | | 74–76 | | 51–53 | 62–64 | 75–76 | 69–71 | 67–69 | 44–46 |
| Shore "A" Hardness$^b$ Bottom | | 76–77 | | 54–55 | 68–70 | 75–76 | 73–75 | 67–69 | 58–62 |
| 5% Modulus (Kp/cm$^2$) | 5 | 19 | 31 | | | 21 | 15 | 38 | |
| 100% Modulus (Kp/cm$^2$) | 31 | 40 | | | | 40 | 33 | | |
| 300% Modulus (Kp/cm$^2$) | 47 | 54 | | | | 45 | 40 | | |
| Tensile Strength (Kp/cm$^2$) | 175 | 179 | 46 | | | 158 | 173 | 50 | |
| Tear Resistance (Kp/cm) R.T.$^c$ | 26 | 29 | 26 | | | 44 | 34 | 28 | |
| Tear Resistance (Kp/cm) 60–70° C. | 15 | 16 | 4 | | | 25 | 20 | 4 | |
| Elongation at Break (%) | 680 | 690 | 70 | | | 500 | 850 | 70 | |

TABLE 1-continued

| RUN | 1 | 2 | 3 | 4 | 5 | 6 | 7 | 8 | 9 |
|---|---|---|---|---|---|---|---|---|---|
| Rebound (%)[d] | 55 | | 52 | 52 | | 52 | 49 | 50 | |

[a]More than 24 hours at 25° C. after cure
[b]Runs 3-5, 8 and 9, 30 minutes at 25° C. after cure
Runs 6 and 7, 60 minutes at 25° C. after cure
[c]DIN 53515
[d]DIN 53512
Kp = kiloponds (kilogram force)

Table 1 shows that Runs 1 through 9 comprised polyurethane formulations of various equivalents ratios of prepolymer:poly(silyl-TDA):diol. The data show that the Shore "A" hardness values (Durometer) of the polyurethane products within about 60 minutes after curing for 100° C. at about 16 hours (18 hours for Runs 6-9) were much lower than the Shore "A" hardness values generated by the same compositions after more than 24 hours at room temperature. The data also show that the formulations of Runs 1, 3, 6 and 7 yielded elastomeric polyurethane product superior to that of the other Runs.

All the cured compositions except those of Runs 1 and 3 became opaque with time after removal from the curing oven.

EXAMPLE 6

In this example the polyol used in the polyurethane formulations, Runs 10-15, was a polypropylene oxide triol sold under the trademark Poly G 8528 by Olin Chemicals. The triol had a free hydroxyl number of 25.9 and a molecular weight of about 6,500. In addition several of the runs contained various catalysts to determine their effect, if any, on the properties of the cured product.

The poly(dimethylsilyltoluenediamine) [poly(silyl-TDA)] was dissolved in the triol at about 100° C. under a nitrogen atmosphere. The mixture was cooled to about 60° C. and catalyst added, if applicable. The polyol/poly(silyl-TDA) mixture and the prepolymer were conditioned and degassed for at least 30 minutes at 60° C. and about 10 mm Hg pressure. The reactants were then mixed by hand for about 30 seconds, poured into an aluminum mold at 100° C. and cured for 12 hours at that temperature. The Shore "A" hardness values were obtained from the cured products which had been maintained at room temperature for 10 days.

Table 2 gives the amounts of the various ingredients and Shore "A" hardness values.

TABLE 2

| RUN | 10 | 11 | 12 | 13 | 14 | 15 |
|---|---|---|---|---|---|---|
| Prepolymer (Adiprene L-167) gm | 45.00 | 47.25 | 47.25 | 47.25 | 47.25 | 47.25 |
| Poly(silyl-TDA) gm | 4.14 | 4.14 | 4.14 | 4.14 | 4.14 | 4.14 |
| Triol (Poly G 8528) gm | 100.86 | 100.86 | 100.86 | 100.86 | 100.86 | 100.86 |
| Equivalents Ratio Prepolymer:Poly(silyl-TDA):Triol | 1.5:1:1 | 1.58:1:1 | 1.58:1:1 | 1.58:1:1 | 1.58:1:1 | 1.58:1:1 |
| Stannous Octoate (28% Sn) gm | — | — | 0.15 | — | — | — |
| Dibutyltin dilaurate gm | — | — | — | 0.15 | — | — |
| Triethylenediamine gm | — | — | — | — | 0.15 | — |
| 18% Antimony gm | — | — | — | — | — | 0.15 |
| Shore "A" Hardness Top | 30-35 | 32-36 | 14-17 | <5 | 23-28 | 43-47 |
| Shore "A" Hardness Bottom | 43-46 | 44-46 | 14-17 | <5 | 23-25 | 50-52 |
| Cured Product | Tacky- (improves) | Tacky- (improves) | Soft & tacky | Very soft; Very tacky | Soft; very little tack | Soft; very little tack |

EXAMPLE 7

In this example, Runs 16 and 17 used a castor oil based polyisocyanate prepolymer sold under the trademark Vorite 128 by NL Industries. This prepolymer had a free isocyanate value of 10.6%. The formulations were cured for 12 hours at 100° C. and Shore "A" hardness values were obtained after the cured product had been at room temperature for about 14 days. Table 3 shows the amounts of the ingredients, Shore "A" hardness values and the extended pot lives.

TABLE 3

| RUN | 16 | 17 |
|---|---|---|
| Prepolymer (Vorite 128) gm | 43.4 | 31.3 |
| Poly(silyl-TDA) gm | 4.7 | 4.7 |
| Triol (Poly G 8528) gm | 114.0 | 114.0 |
| Equivalents Ratio Prepolymer:Poly(silyl-TDA):Triol | 2.1:1:1 | 3:2:2 |
| 18% Antimony gm | 0.15 | 0.15 |
| Shore "A" Hardness Top | 54-55 | 36-37 |
| Shore "A" Hardness Bottom | 51-52 | 33-34 |
| Tear Resistance | Poor | Poor |
| Pot Life | 20 min | 10 min |

EXAMPLE 8

In this example polyisocyanate prepolymers A, B and C were prepared from toluene diisocyanate and a CAPA polyol based on caprolactone and sold by Interox, Ltd. Under a nitrogen atmosphere and anhydrous conditions toluene diisocyanate was heated to about 50° C. in a reaction vessel and the polyol was added in 3 aliquots allowing about 1.5 hours at 80° C. mixing after each addition. This operation was followed by a 2 hour additional mixing at about 80° C. and finally 30 minutes at 80° C. and a reduced pressure of 10-20 mm Hg for prepolymers A and C and a reduced pressure of 1-5 mm Hg for prepolymer B. Table 4 gives the amounts of toluene diisocyanate and polyol used in each prepolymer mix.

TABLE 4

| Prepolymer | A | B | C |
|---|---|---|---|
| Toluenediisocyanate gm | 70.3 | 147.7 | 254 |
| Polyol CAPA-220 gm (M. Wt. 2000) | 402.6 | — | — |

TABLE 4-continued

| Prepolymer | A | B | C |
|---|---|---|---|
| CAPA-212 gm (M. Wt. 1000) | — | 400.8 | — |
| CAPA-200 gm (M. Wt. 550) | — | — | 399.3 |
| Actual % - NCO | 3.73 | 6.9 | 9.14 |

EXAMPLE 9

In this example the prepolymers of Example 8 were formulated with poly(silyltoluenediamine) [poly(silyl-TDA)] and various diols based on caprolactone. The amounts of the various components are shown in Table 5. An extender mix comprising the diol and poly(silyl-TDA) was prepared by heating the mixture to about 100° C. to dissolve the silyl-TDA polymer. The extender mix and the prepolymer were each conditioned by heating for 1 hour at 60° C. and 10 mm Hg pressure where upon they were mixed for about 20 seconds by hand, poured into an aluminum mold heated to 100° C. and then cured for 12 hours at 100° C. in a forced convection oven. The formulation of Run 22 set-up after mixing for about 10 seconds. Each run contained a polyisocyanate prepolymer:silyl-TDA polymer:polyol equivalent ratio of 3:2:2 with the exception of Runs 26 and 27 which contained 3% and 5% excess free isocyanate, respectively, compared to Run 25.

100° C. The pot lives of Runs 28 and 29 at 100° C. were about 1 minute and 12 minutes, respectively. The cured product of Run 29 had the following properties after about 30 days at room temperature:

| Shore "A" Hardness | 85 |
|---|---|
| 5% Modulus | 13 Kp/cm$^2$ |
| 100% Modulus | 22 Kp/cm$^2$ |
| 300% Modulus | 23 Kp/cm$^2$ |
| Tensile Strength | 72 Kp/cm$^2$ |
| Ultimate Elongation | 780% |
| Tear Resistance @ RT | 32 Kp/cm |
| @ 60° C. | 3 Kp/cm |
| Rebound | 37% |

The formulation of Run 30 was mixed by hand at room temperature yielding after about 3 minutes a grainy opaque liquid which transformed into a grainy opaque elastomeric material after about 5 days at room temperature. A small portion of the formulation held for 30 minutes at about 150° C. yielded a clear viscoelastic liquid which stayed clear when cooled to room temperature.

The components of Run 31 were mixed for 5 minutes by hand with soft gel particles appearing after about 1 minute. After curing for 12 hours at 150° C. the product was a foamy elastomer having a hard skin and a soft semi-cured interior with an isocyanate odor.

Hand mixing of the components of Run 32 yielded

TABLE 5

| RUN | 18 | 19 | 20 | 21 | 22 | 23 | 24 | 25 | 26 | 27 |
|---|---|---|---|---|---|---|---|---|---|---|
| Prepolymer A gm | 114.87 | 94.29 | — | — | — | — | — | — | — | — |
| Prepolymer B gm | — | — | 91.5 | 67.1 | — | — | — | 91.5 | 94.3 | 96.1 |
| Prepolymer C gm | — | — | — | — | 97.7 | 80.6 | 56.3 | — | — | — |
| Extender Mix (Polyol + Diamine) gm | 35.13 | 55.71 | 58.5 | 82.9 | 52.3 | 69.4 | 93.7 | 58.5 | 58.5 | 58.5 |
| Polyol | | | | | | | | | | |
| CAPA 212 gm | 42.37 | — | 59.33 | — | — | 58.8 | — | 49.6 | 49.6 | 49.6 |
| CAPA 220 gm | — | 64.47 | — | 82.9 | — | — | 86.3 | — | — | — |
| CAPA 200 gm | — | — | — | — | 39.5 | — | — | — | — | — |
| Poly(silyl-TDA) gm | 7.63 | 5.53 | 10.67 | 7.1 | 12.8 | 10.6 | 7.4 | 8.9 | 8.9 | 8.9 |
| Cure @ 100° C. (hours) | 12 | 12 | 12 | 12 | 12 | 12 | 12 | 12 | 12 | 12 |
| Cure @ 25° C. (days) | 19 | 19 | 33 | 33 | 7 | 11 | 11 | 30 | 30 | 30 |
| Clarity (@ 25° C.) | opaque | opaque | clear | opaque | opaque | clear | clear | — | — | — |
| Shore "A" Hardness | 92 | 96 | 61 | 90 | 95 | 77 | 78 | 64 | 65 | 65 |
| 5% Modulus (Kp/cm$^2$) | 20 | 26 | 0 | 16 | | 9 | 10 | — | — | — |
| 100% Modulus (Kp/cm$^2$) | 37 | 57 | 17 | 34 | | 32 | 29 | 14 | 15 | 16 |
| 300% Modulus (Kp/cm$^2$) | 47 | 68 | 37 | 44 | | 67 | 49 | 31 | 34 | 35 |
| Tensile Strength (Kp/cm$^2$) | 251 | 377 | 210 | 225 | 194 | 259 | 243 | 303 | 276 | |
| Ultimate Elongation (%) | 920* | 810* | 680 | 830 | | 480 | 650 | 650 | 630 | 600 |
| Tear Resistance (Kp/cm) @ RT$^a$ | 49 | 65 | 24 | 43 | | 27 | 27 | 18 | 16 | 18 |
| @ 60° C. | 20 | 22 | 19 | 26 | | 16 | 17 | 15 | 13 | 12 |
| Rebound (%)$^b$ | 36 | 38 | 36 | 38 | | 30 | 30 | 40 | 40 | 40 |

$^a$DIN 53515
$^b$DIN 53512
*No failure (specimen did not break)

EXAMPLE 10

In this example polyurethane formulations containing a polyisocyanate prepolymer of Example 8 and poly(-dimethylsilylethylenediamine) [poly(silyl-EDA)] or poly(dimethylsilyltoluenediamine) [poly(silyl-TDA)] and optionally other components in amounts as shown in Table 6 were prepared and cured.

In Runs 28 and 29 poly(silyl-TDA) and the polyol were mixed at about 100° C. to effect a solution. The solution was cooled to 60° C. and phenylmercuric propionate added in Run 28. This mixture and the prepolymer were conditioned and degassed for at least 30 minutes at 60° C. and reduced pressure. The reactants were mixed by hand for about 30 seconds, poured into an aluminum mold at 100° C. and cured for 12 hours at soft gel particles after about 3 minutes. Curing for 12 hours at 150° C. gave a foamy elastomer having a hard skin but a soft, fully cured interior with no isocyanate odor.

Upon heating the components of Run 33 to about 100° C. in order to dissolve the poly(silyl-TDA), the mixture set-up hard after about 30 seconds of hand mixing. On the other hand, the inclusion of plasticizer dioctylphthalate in Run 34 permitted the formulation to be mixed for 5 minutes and cured at 150° C. for 12 hours to yield a tough, very hard elastomer having a Shore "A" hardness of 95.

The cured products of Runs 31–34 are polyureas.

TABLE 6

| RUN | 28 | 29 | 30 | 31 | 32 | 33 | 34 |
|---|---|---|---|---|---|---|---|
| Prepolymer A gm | 99.87 | 99.87 | — | — | — | — | — |
| Prepolymer B gm | — | — | 13.42 | — | — | — | — |
| Prepolymer C gm | — | — | — | 22.2 | 22.2 | 20.96 | 20.96 |
| CAPA 200 Polyol gm | — | — | 5.95 | — | — | — | — |
| CAPA 212 Polyol gm | 29.27 | 29.27 | — | — | — | — | — |
| Poly(silyl-EDA) gm | — | — | 0.63 | 2.8 | 1.4 | — | — |
| Poly(silyl-TDA) gm | 5.26 | 5.26 | — | — | — | 4.04 | 4.04 |
| Phenyl mercuric propionate (20%) gm | — | — | 0.02 | — | — | — | — |
| Phenyl mercuric propionate (100%) gm | 0.60 | — | — | — | — | — | — |
| Dioctylphthalate gm | 15.00 | 15.00 | — | — | 1.4 | — | 4.04 |

EXAMPLE 11

This example demonstrates the increase in the time required for an elastomeric polyurethane formulation to set up, i.e. increased pot life, by the use of a poly(silyldiamine) in the formulation. The pot life was measured as the elapsed reaction time until the viscosity of the reaction mixture was high enough to stop the motion of a disc reciprocating at constant force within the reaction mixture. Table 7 shows relative molar amounts of prepolymer, diamine chain extender and polyol used in each run. The formulation of each run was held at 50±3° C. Runs 36 and 37 in which the toluenediamine was added as poly(dimethylsilyltoluenediamine)[poly(-silyl-TDA)] showed significantly increased pot lives over Run 35.

TABLE 7

| Run | 35 | 36 | 37 |
|---|---|---|---|
| Prepolymer (Adiprene L-167) | 2 | 3 | 2 |
| Toluenediamine | 1 | — | — |
| Poly(silyl-TDA) | — | 2 | 1 |
| Diol (CAPA 200) | 1 | 2 | 2 |
| Pot Life (min) | 2.15 | 4.57 | 3.61 |

EXAMPLE 12

This example shows the preparation of poly(dimethylsilylbutanediamine) via a transamination reaction and a polyurethane elastomer prepared using the poly(silyldiamine).

Under anhydrous conditions and a nitrogen atmosphere 47.0 g (0.533 moles) distilled 1,4 butanediamine and 78.0 g (0.533 moles) bis(dimethylamino)dimethylsilane were charged to a reaction vessel and heated for 4 hours starting at 50° C. and slowly rising to about 150° C. as the dimethylamine distilled off. The total dimethylamine distillate was 46.06 g (95.8% of theory). Poly(-dimethylsilyl butanediamine) (25 g) was transferred to a kugelrohr distillation apparatus and heated for 4 h. starting at about 25° C. and slowly rising to 140° C. at about 1 torr yielding 2.69 g of volatile oligomers, dimethylamine and unreacted 1,4-butanediamine.

The distillation pot residue was used to prepare a polyurethane elastomer combining 4.64 g of the residue [poly-(dimethylsilylbutanediamine)], 31.81 g of CAPA-212 polyol and 65.55 g of a prepolymer (6.1% NCO) prepared as described in Example 8 from TDI and CAPA-212 polyol (mole ratio 2:1). All three components were mixed together by hand at room temperature and after about 15 seconds of mixing the material set-up hard. After curing the elastomer for 12 hr @ 100° C. a test for hardness showed 95 on the Shore "A" scale.

EXAMPLE 13

This example shows the preparation of polyurethanes using polyisocyanates other than prepolymers and a polyol other than a polymeric polyol. PPG-1025 polyol is polyoxypropylene glycol marketed by Union Carbide Corp. Table 8 shows the quantities of reactants used in each run. In Runs 38 and 39 the poly(dimethylsilyltoluenediamine) was premixed with heating in the polyol, then cooled to about 25° C. before the toluenediisocyanate was added. The ingredients in Run 40 were simply blended at 25° C. The pot life for Run 39 was about 2 hours while for Runs 38 and 40 it was 15 and 30 seconds, respectively. If the poly(silyl-TDA) were replaced by toluenediamine in the recipes, the pot lives would be too short to allow effective mixing.

TABLE 8

| RUN | 38 | 39 | 40 |
|---|---|---|---|
| Toluenediisocyanate gm | 27.4 | 26.9 | 74.0 |
| Poly(silyl-TDA) gm | 18.7 | 18.3 | 101[a] |
| CAPA-212 Polyol gm | 103.9 | — | — |
| PPG-1025 Polyol gm | — | 104.8 | — |
| 1,4-Butanediol gm | — | — | 25.5 |
| Pot Life @ 25° C. | 15 sec. | ~2h. | 30 sec.[b] |
| Shore "A"; 12h @ 100° C. | 90 | 91 | — |
| 5% Modulus (Kp/cm$^2$) | 19 | 25 | |
| 100% Modulus (Kp/cm$^2$) | 62 | 59 | |
| 300% Modulus (Kp/cm$^2$) | 166 | — | |
| Tensile Strength (Kp/cm$^2$) | 166 | 93 | |
| Ultimate Elongation (%) | 300 | 270 | |
| Tear Resistance (Kp/cm) @ R.T.[c] | 33 | 25 | |
| @ 60° C.[d] | 21 | 18 | |
| Rebound (%) | 37 | 38 | |

[a]50/50 (w/w) Poly(silyl-TDA)/Dioctylphthalate
[b]Severe exotherm with foaming. Cures to a hard friable material.
[c]DIN 53515
[d]DIN 53512

EXAMPLE 14

This example, which involves the reaction of poly(-dimethylsilyltoluenediamine) and ethyl carbanilate, supports the hypthesis that the toluenediamine is probably incorporated into the polyurethane reaction product after the polyol has reacted with the polyisocyanate to give urethane linkages. It is believed the poly(dimethylsilyltoluenediamine) then reacts with the urethane linkages incorporating the TDA via newly formed urea linkages and liberating the dimethylsilyl functionality which reacts with terminal oxy functionality from the reacted urethane linkage.

Ethyl carbanilate was added to poly(dimethylsilyltoluenediamine) in the ratio of 165 parts to 89 parts in a small distilling flask. The mixture was heated gradually and, when the temperature of the flask reached 125° C., a colorless liquid distilled over. This material was identified by its proton nuclear magnetic resonance spectrum as diethoxydimethylsilane. When the same process was repeated with ethyl benzoate or with ethyl hexanoate, no reaction occurred even if the mixture were heated up to the boiling point of the ester showing that only urethanes take part in this reaction.

EXAMPLE 15

This example demonstrates the existence of the carbodiimide functionality in the polyurethane reaction product which results in hydrolytic stability.

Using a razor blade a thin sliver was cut from the polymer of Run 1, Example 5, and its infra red spectrum was determined. There was a small band at 2270 cm$^{-1}$ showing the presence of a small amount of unreacted isocyanate and a larger band at 2040 cm$^{-1}$ showing the presence of carbodiimide groups. In the infra red spectra obtained by attenuated total reflectance at 30° and 45°, these bands were just barely detectable. Both isocyanate and carbodiimide in the surface layers to which attenuated total reflectance is sensitive would be expected to be consumed by reaction with atmospheric moisture.

EXAMPLE 16

This example shows the preparation of poly(propylmethylsilyltoluenediamine) via a transamination reaction.

Under anhydrous conditions and a nitrogen atmosphere 43.3 g (0.354 moles) of freshly distilled m-toluenediamine and 58.9 g (0.338 moles) of bis-(dimethylamino)propylmethyl silane [Silar Lab, Scotia, NY] were charged to a reaction vessel and heated for 6 hours starting at 60° C. and slowly rising to about 120° C. as the dimethylamine distilled off. The distillate weight was 22.08 g (72.63% of theory). The reaction mixture was allowed to cool to room temperature overnight. The following day the reaction was again heated from about 110° C. to about 150° C. under vacuum with system pressure slowly decreased from about 100 torr to about 5 torr over a four hour period and then maintained at about 150° C. and 5 torr for an additional hour. Volatile materials were condensed in a trap cooled with liquid nitrogen. The net weight from the trap was 6.5 g giving a total yield of 28.58 g or 94.0% based on dimethylamine. The polymeric residue in the reaction vessel was designated PMS-TDA-1.

EXAMPLE 17

This example shows a larger scale preparation of poly(propylmethylsilyltoluenediamine) via a transamination reaction.

Under anhydrous conditions and a nitrogen atmosphere 176.6 g (1.44 moles) of freshly distilled m-toluenediamine and 252.04 g (1.44 moles) of bis-(dimethylamino)propylmethyl silane were charged to a reaction vessel and heated for 5 hours starting at 70° C. and slowly rising to about 150° C. as the dimethylamine distilled off. The weight of the dimethylamine distillate was 85.24 g (65.5% of theory). After cooling to room temperature overnight, the reaction mixture was again heated for 5 hours at 130° to 150° C. under vacuum with system pressure slowly decreased from about 100 torr to about 5 torr over a 4 hour period and then maintained at about 150° C. and 5 torr for one hour. Volatile materials were condensed in a trap cooled with liquid nitrogen. After cooling the reaction mixture at atmosphere pressure and a nitrogen atmosphere to about 80° C., the cold trap was removed, weighed and allowed to warm to room temperature under a slight nitrogen flow until a constant weight was obtained which showed a weight loss of 10.3 g (dimethylamine) and a water-white oily residue (24.7 g) which by proton NMR analysis was similar to the bis-(dimethylamino)propylmethyl silane. The polymeric material (301.4 g) from the reaction vessel was designated PMS-TDA-2. The mass balance for the reaction was 98.3%.

Polymeric material PMS-TDA-2 (24.25 g) was transferred to a kugelrohr distillation apparatus and heated for 3 hours at 130°–140° C. and about 0.025 torr yielding 2.55 g of volatile materials and a distillation residue (PMS-TDA-3).

EXAMPLE 18

This example shows the preparation of polyurethane elastomers using the poly(propylmethylsilyltoluenediamine) polymers [PMS-TDA-1,2 and 3] from Examples 16 and 17.

Polyurethane elastomers were prepared as described in Example 9 using the same polyols and a prepolymer similar to prepolymer B which was prepared following the method of Example 8 and showed an isocyanate content of 6.1%. An equivalent weight of 103 was used for all poly(propylmethylsilyl-TDA) polymers. The amounts of the various elastomer components and test results are shown in Table 9. Run 42 was a repeat of Run 41 due to gel particles found in the prepolymer during weighing. Freshly opened prepolymer was used in Run 42. All elastomers were prepared using an equivalent ratio of 3:2:2 for the prepolymer:poly(propylmethylsilyl-TDA):polyol. The elastomer of Run 45 did not fail during the tensile test.

TABLE 9

| RUN | 41 | 42 | 43 | 44 | 45 |
|---|---|---|---|---|---|
| Prepolymer (6.1% NCO) gm | 63.34 | 63.34 | 73.25 | 73.25 | 73.25 |
| CAPA 212 Polyol (OH# 113.4) gm | 30.34 | 30.34 | | | |
| CAPA 200 Polyol (OH# 204.5) gm | | | 19.45 | 19.45 | 19.45 |
| PMS-TDA-1 gm | 6.32 | 6.32 | 7.30 | | |
| PMS-TDA-2 gm | | | | 7.30 | |
| PMS-TDA-3 gm | | | | | 7.30 |
| Pot-life @ 100° C. (min) | 25 | 26 | 24 | 21 | 30 |
| Shore "A" Hardness | 30–45 | 24 | 37 | 47 | 49 |
| 5% Modulus (Kp/cm$^2$) | | | | | 2.0 |
| 100% Modulus (Kp/cm$^2$) | | 5.7 | 5.9 | 7.0 | 7.4 |
| 300% Modulus (Kp/cm$^2$) | | | 11.6 | 11.3 | 15.9 |
| Tensile Strength (Kp/cm$^2$) | | 9.3 | 12.1 | 22.1 | 58.3 |
| Tear Resistance (Kp/cm) | | | | | |
| @ RT | 7 | 10 | 9 | 10 | 11 |
| @ 60° C. | 0 | 0 | 0 | 2 | 8 |
| Elongation (%) | | 210 | 640 | 900 | 770 |
| Rebound (%) | 31 | 29 | 28 | 28 | 30 |

EXAMPLE 19

This example shows the preparation of poly(diphenylsilyltoluenediamine) via a transamination reaction.

Under anhydrous conditions and a nitrogen atmosphere 50.0 g (0.21 moles) of bis-(dimethylamino)diphenylsilane [Petrarch Systems, Inc., Bristol, PA] and 22.58 g (0.185 moles) of distilled toluenediamine were heated for 5 hours starting at 90° C. and slowly rising to about 170° C. as 10.81 g (64.98%) dimethylamine distilled off. After cooling the reaction mixture overnight under a nitrogen atmosphere, the mixture was heated for 4 hr at 130° to 170° C. under vacuum with system pressure slowly decreased from about 100 torr to about 0.01 torr. The dimethylamine from the reaction was condensed in a trap cooled with liquid nitrogen. An undetermined amount of dimethylamine distilled from the reaction mixture. Material (20.1 g) from the reaction vessel (DPS-TDA-1) was transferred to a kugelrohr distillation apparatus and heated for 3 hr. at 120°–130° C. under vacuum while slowly decreasing the pressure from about 100 torr to about 0.1 torr yielding 1.16 g of volatile materials trapped at 0° C. and a distillation pot residue (DPS-TDA-2).

EXAMPLE 20

This example shows the preparation of polyurethane elastomers from poly(diphenylsilyltoluenediamine) of Example 19 using the prepolymer from Example 18 and the methods of Example 8. The equivalent weight for poly(diphenylsilyltoluenediamine) was assumed to be 151. The amounts of the various elastomer components and test results are shown in Table 10.

TABLE 10

| RUN | 46 | 47 |
| --- | --- | --- |
| Prepolymer (6.1% NCO) gm | 70.82 | 70.82 |
| CAPA-200 Polyol (OH# 204.5) gm | 18.81 | 18.81 |
| DPS-TDA-1 gm | 10.37 | — |
| DPS-TDA-2 gm | — | 10.37 |
| Pot-life @ 100° C. (min) | 6 | >28 |
| Shore "A" Hardness (12h @ 100° C.) | 62 | 58 |

STATEMENT OF INDUSTRIAL APPLICATION

Depending upon the functionality degree of the polyisocyanate and polyol, cured polyurethane formulations of the invention provide adhesives for metal, glass, plastics and wood; rubber adhesives; coatings designed to give a wide variety of properties which include toughness, abrasion resistance, flexibility, and resistance to moisture, solvents, chemicals and elevated temperatures, such properties make these materials especially attractive for electrical wire coatings; flexible and rigid foams; and elastomers useful in shoe soles and heels, conveyor belts, drive belts, pump diaphragms, ball joint covers and tires in automobiles.

We claim:

1. A composition of matter comprising
   (a) a polyisocyanate,
   (b) a poly(silyldiamine) containing the unit formula

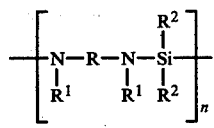

wherein the grouping

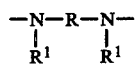

is a divalent organic radical terminated by two nitrogen atoms with R being a divalent organic moiety, or a divalent alicyclic radical in which R and $R^1$ with the two nitrogen atoms form a cyclic diamine structure, $R^1$ is hydrogen or a monovalent hydrocarbon, $R^2$ is a monovalent hydrocarbon, and n is an integer greater than 1, and
   (c) a polyol.

2. The composition of claim 1 wherein the equivalent amount of poly(silyldiamine) is within the range from $0.9(I-P)$ to $(I+P)$ where I=equivalents of free isocyanate in the polyisocyanate, P=equivalents of free hydroxyl in the polyol and an equivalent weight of poly(silyldiamine) is one-half the formula weight of $-[N(R^1)-R-N(R^1)-Si(R^2)_2]-$ where R, $R^1$ and $R^2$ are as defined in claim 1.

3. The composition of claim 2 wherein the equivalent amount of poly(silyldiamine) is within the range from $(I-P)$ to $(I+P)/2$.

4. The composition of claim 1 wherein R is a $C_2$-$C_{10}$ alkylene, cycloalkylene, or arylene radical and $R^1$ is hydrogen or a $C_1$-$C_4$ alkyl radical and $R^2$ is a $C_1$-$C_8$ alkyl radical, aryl radical, aralkyl radical, alkenyl radical, cycloalkyl radical or cycloalkenyl radical.

5. The composition of claim 4 wherein R is ethylene, butylene or tolylene and $R^1$ is hydrogen.

6. The composition of claim 5 wherein $R^2$ is methyl.

7. The composition of claim 1 wherein the poly(silyldiamine) is poly(dimethylsilyltoluenediamine), poly(dimethylsilylethylenediamine), poly(dimethylsilylbutanediamine), poly(propylmethylsilyltoluenediamine) or poly(diphenylsilyltoluenediamine).

8. The composition of claim 1 wherein the organic polyisocyanate is of the general formula $R^4(NCO)_x$ wherein x is an integer of at least 2 and $R^4$ is an organic radical having x isocyanate groups and selected from the group consisting of aliphatic radicals, cycloaliphatic radicals, aromatic radicals, heterocyclic radicals, and polymeric radicals comprising a polyalkylene ether or polyester structure.

9. The composition of claim 1 wherein the polyisocyanate is a diisocyanate having a divalent organic radical which is an aromatic radical or a polymeric radical having aromatic end groups which containing an isocyanate radical.

10. The composition of claim 9 wherein the diisocyanate is toluene diisocyanate.

11. The composition of claim 9 wherein the diisocyanate is a diisocyanate prepolymer which is the reaction product of an excess of toluene diisocyanate and polycaprolactone polyol or poly(tetramethyleneglycol).

12. The composition of claim 1 wherein the polyol is a polyalkylene ether polyol or a polyester polyol.

13. The composition of claim 12 wherein the polyol is the product of reacting caprolactone with a diol.

14. A composition of matter for preparing an elastomeric composition comprising
   (a) a polyisocyanate prepolymer of the formula

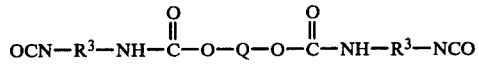

wherein $R^3$ is a divalent organic radical and Q is a divalent polymeric chain,
   (b) a polysilyldiamine containing the unit formula

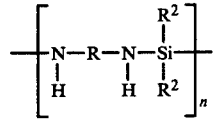

wherein R is a divalent organic radical, $R^2$ is a monovalent hydrocarbon and n is an integer greater than 1, and
   (c) a polyol of the formula $HO-Q^1-OH$ wherein $Q^1$ is a divalent polymeric chain.

15. The composition of claim 14 wherein R of the polysilyldiamine formula is a tolylene radical.

16. The composition of claim 14 wherein the polysilyldiamine is poly(dimethylsilyltoluenediamine).

17. The composition of claim 14 wherein $R^3$ is tolylene and Q comprises a polyalkylene ether or polyester chain.

18. The composition of claim 14 wherein the polyisocyanate prepolymer is the reaction product of an excess of toluenediisocyanate with polycaprolactone polyol or poly(tetramethylene glycol).

19. The composition of claim 14 wherein the polyol is a polyalkylene ether polyol or a polyester polyol.

20. The composition of claim 9 wherein the polyol is polycaprolactone polyol or poly(tetramethylene glycol).

21. A polyurethane reaction product made from the compositions of claims 1 or 14.

22. A method for preparing a polyurethane composition comprising mixing together the components of the compositions of claims 1 or 14.

23. A method for preparing a polyurethane reaction product comprising curing the compositions of claims 1 or 14.

* * * * *

UNITED STATES PATENT AND TRADEMARK OFFICE
CERTIFICATE OF CORRECTION

PATENT NO. : 4,448,939
DATED : May 15, 1984
INVENTOR(S) : Michael J. Fasolka and Barton Milligan It is certified that error appears in the above-identified patent and that said Letters Patent are hereby corrected as shown below:

Column 22, Line 28
   Delete "which" and substitute therefor -- each --

Column 24, Line 1
   Delete "9" and substitute therefor -- 19 --

Signed and Sealed this

Twenty-third Day of October 1984

[SEAL]

Attest:

GERALD J. MOSSINGHOFF

Attesting Officer    Commissioner of Patents and Trademarks